Figure 1:
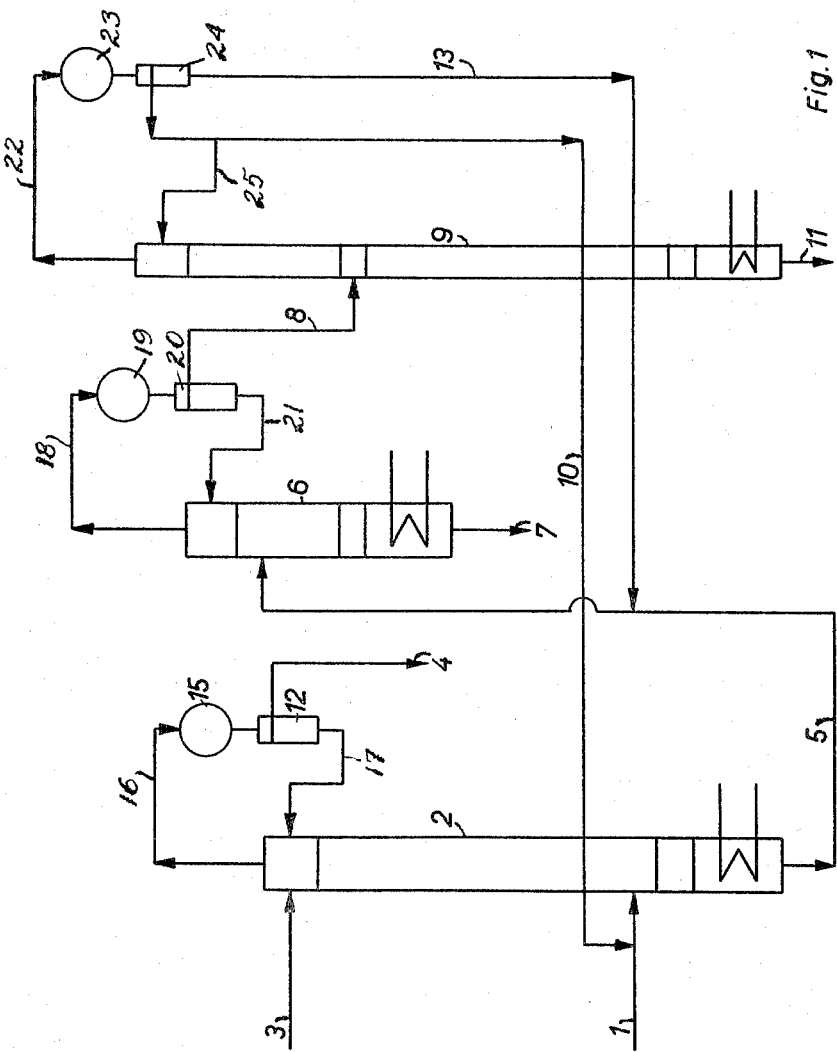

3,264,197
PROCESS FOR THE CONTINUOUS RECOVERY OF ACRYLONITRILE AND ACETONITRILE BY PLURAL DISTILLATION AND THE ADDITION OF WATER
Rupert Schönbeck, Leonding, near Linz, and Kazimierz Krzemicki, Linz, Austria, assignors to Osterreichische Stickstoffwerke Aktiengesellschaft, Linz, Austria
Filed May 18, 1962, Ser. No. 195,808
Claims priority, application Austria, May 27, 1961, A 4,152/61
4 Claims. (Cl. 203—84)

This invention relates to a process for the continuous recovery of acrylonitrile and acetonitrile.

In the synthesis of acrylonitrile by various methods, for example the reaction of hydrocyanic acid with acetylene, dehydrogenation of propionitrile, the reaction of propylene with ammonia and oxygen, or the reaction of acrolein with ammonia, acetonitrile is usually also obtained as a by-product in addition to the acrylonitrile. It is very difficult to separate acrylonitrile and acetonitrile, since the boiling points of the two nitriles differ by only 3° C. Even if very tall distillation columns are used it is not possible to completely separate the two nitriles in a single distillation operation, and it is usually necessary to subject both the acrylonitrile and the acetonitrile to repeated purification by distillation, and this makes the process very expensive.

A process is also known wherein it is not the pure nitriles themselves, but their azeotropes that are subjected to fractional distillation with water, since the boiling points of the azeotropes are somewhat wider apart, namely 6° C. apart. Here again, however, the difference in boiling points is still too small to give satisfactory purity of acrylonitrile and acetonitrile in practice.

For separation of the two nitriles it has also been proposed to utilise the much greater solubility of acetonitrile in water and eliminate the acetonitrile during the distillation of the azeotrope of acrylonitrile by washing it out of the distillation gases by means of hot water. With this known method, which has been described more particularly with reference to the separation of acrylonitrile-acetonitrile mixtures in a ratio of 1:1, hot water is fed to the top of a distillation column during distillation. A pure acrylonitrile water azetrope is obtained under these conditions in the first instance at the head of the column in a discontinuous method, and then a mixture of the two azeotropes, and finally, at the end of distillation acrylonitrile free acetonitrile azeotrope. This method has the disadvantage that it cannot be adapted to continuous operation, since without the discontinuous fractionation pure acrylonitrile azeotrope is obtained at the head of the column only if the amount of washing water is increased to such an extent that the acetonitrile solution accumulating in the bottom of the column is so diluted that it is very expensive to recover the readily soluble acetonitrile therefrom. Such a continuous process, therefore, can be applied economically only if the acetonitrile content of the mixture is so low that the acetonitrile can be discarded together with the washing liquors.

A further known method does not make use of extractive distillation alone to separate the two nitriles, but effects enrichment of the acetonitrile and at the same time separation of the major quantity of acrylonitrile before distillation by preceding distillation by liquid-liquid extraction, in which a saturated aqueous solution of acrylonitrile is used as a selective solvent for acetonitrile. This liquid-liquid extraction stage then gives an aqueous solution which already contains more acetonitrile than acrylonitrile. In the subsequent extractive distillation complete separation into acrylonitrile and acetonitrile is obtained, but despite the pre-concentration the acetonitrile still accumulates in the form of a very dilute solution, from which the acetonitrile-water azeotrope can be recovered only by distillation and then has to be dried further. Apart from this, this method is very expensive since the apparatus required for liquid-liquid extraction and the distillation columns also necessary require considerable expenditure.

The present invention relates to a method of recovering acrylonitrile and acetonitrile side by side, and despite its continuous mode of operation it requires much lower expenditure in respect of distillation, and the major part of the acrylonitrile is obtained as a fully acetonitrile-free azeotropic mixture with water after one distillation stage, while the acetonitrile is obtained as a substantially anhydrous pure product and hence the complicated recovery of acetonitrile from dilute aqueous solutions is avoided.

The method according to the invention is a three-stage continuous fractional distillation. The method makes use of (1) the high extraction action of water for acetonitrile, (2) the formation of the azeotropes with water and (3) the limited miscibility of acrylonitrile-acetonitrile mixtures with water. Suitable starting materials are liquid mixtures of acrylonitrile, acetonitrile and varying amounts of water, in which the acetonitrile contents is 2 to 20% by weight of the acrylonitrile content.

The first distillation stage is an extractive distillation. The liquid nitrile-water mixture is introduced into a distillation column at the bottom part thereof, preferably at about ¼ of the height of the column. 150 to 400 times the quantity of water by weight based on the acetonitrile are introduced at the top of the column and the top three-quarters of the column are kept at a temperature of less than 71° C. The acrylonitrile reflux can be kept low and generally a reflux ratio of 1:2 to 1:5 is sufficient. In this way the top of the column gives the major quantity of acrylonitrile as a completely acetonitrile-free acrylonitrile-water azeotrope, from which anhydrous acrylonitrile is obtained in the usual way. A mixture of acetonitrile-acrylonitrile and water is drawn off from the bottom part of the column, and its acrylonitrile content may at the most just reach the value of the acetonitrile content.

This mixture is freed from the major quantity of water in a second distillation stage. It is important that not only the acetonitrile and water but also a certain acrylonitrile content should be present (about 30 to 100 parts of acrylonitrile to 100 parts of acetonitrile), since only then does the head product contain sufficient acrylonitrile to ensure layer separation and hence automatic separation of the organic phase. The water accumulating in the bottom of the column may be used to feed the extractive distillation column of the first stage.

The acrylonitrile-acetonitrile mixture accumulating at the top of the distillation column and still containing about 10 to 15% water is fed into the top part of a distillation column in the third distillation stage, the top of the column used in such third distillation being maintained at a temperature just below 73° C., for example, about 72° C., and a temperature gradient being maintained in the top four-fifths of such column starting with such temperature at the top to 76° C. The reflux, which is heterogeneous, is fed through a separator, and the amount of water extracted from the aqueous phase and returned to the extraction distillation column of the first stage is such that the quantity of water taken from the column corresponds to the quantity of water continuously supplied to the column with the feed product. All the acrylonitrile distils off at the head of the column in the form of a low-boiling azeotropic mixture, while the major quantity of the acetonitrile accumulates in the pure and anhydrous state in the bottom of the column and only part of the acetonitrile passes off with the acrylonitrile. The column can be kept relatively short since the head product does not have to be absolutely free from acetonitrile. The acrylonitrile-acetonitrile water mixture drawn from the top layer of the separator is returned to the first stage, and the acetonitrile accumulating at the bottom of the column is so pure that it requires no further purification.

Since the first stage intentionally does not aim at complete separation of acrylonitrile and acetonitrile, so that distillation of the acetonitrile can be performed simply and satisfactorily in the second stage, the latter also requires a much shorter column than used for such extractive distillation of the two nitriles in other cases. Use is advantageously made of a bubble tray column containing about 10 to 25 practical trays. The exact choice of the amount of water within the range of 150 to 400 times the quantity based on the acetonitrile as stated according to the invention, depends on the specific process conditions, for example the height of the column and the acetonitrile content of the starting mixture.

The starting mixture is advantageously a liquid mixture of acrylonitrile and acetonitrile having a low water content, such as is obtained, for example, by washing all the nitriles out of the reaction gases of the synthesis reactor with water and subsequent distillation of the nitriles in a distillation column. In this case the acrylonitrile-acetonitrile-water mixture fed to the second stage is obtained in the bottom of the column of the first stage. Alternatively, the dilute aqueous nitrile solution may be used without prior concentration in a distillation column for the method according to the invention; in that case tha acrylonitrile-acetonitrile-water mixture advantageously is not drawn from the bottom of the column but a few trays above the bottom while the excess water accumulates in the bottom of the column. The place of introduction of the starting mixture into the column is then at about one-quarter of the column height, counting from the place of discharge of the nitrile solution.

Figure 2:
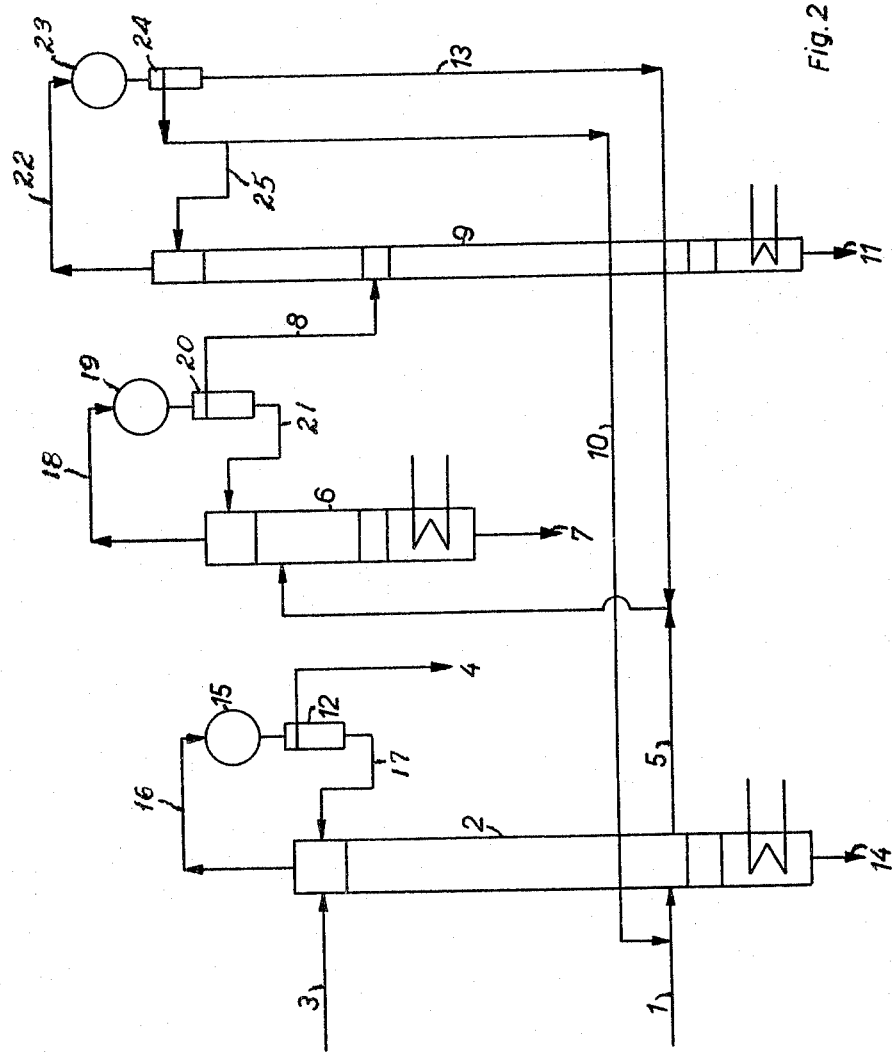

Suitable apparatus for performing these two alternative methods are illustrated in the accompanying drawings. In the drawing, FIG. 1 shows the apparatus for performing the method with a low-water-content nitrile mixture, and FIG. 2 shows an apparatus for performing the method with a dilute aqueous nitrile solution as starting product.

In each of the figures, 1 denotes the starting mixture feed pipe and 2 the extraction distillation column to which water is fed at 3. The acrylonitrile water azeotrope emerges from the top of the column 2 through tube 16, is condensed in condenser 15 and is separated into layers in the decanter 12. The acetonitrile-free acrylonitrile is taken from the organic layer at 4 and the reflux is fed to column 2 through tube 17. The pipe 5 leads the acetonitrile-acrylonitrile-water mixture—which in FIG. 1 accumulates at the bottom of the column and in FIG. 2 at one of the lower trays, to the distillation column 6. The waste water of the column 6 leaves at 7. The vapor leaves column 6 through pipe 18, is condensed in condenser 19 and separated into two layers in decanter 20 from which the organic layer is fed through pipe 8 to column 9, while the water layer is returned through pipe 21 to column 6. The pure acetonitrile is separated from acrylonitrile-acetonitrile-water mixture in column 9 and such pure acetonitrile which accumulates at the bottom of such column is drawn off through pipe 11. Simultaneously, the vapors leaving through pipe 22 are condensed in condenser 23 and continuously separated into two layers in decanter 24, one being water and the other an acrylonitrile-acetonitrile-water mixture, the separated acrylonitrile-acetonitrile-water mixture being fed back to colum 2 through pipe 10. At 13, the water separated in the decanter 24 of the column 9 is returned to the pipe 5 unless it is returned to the column 9 with the reflux from the organic layer through pipe 25. The excess pure water leaves the column 2 at 14 in FIG. 2.

In many cases hydrocyanic acid is a further impurity in the acrylonitrile. Before the method according to the invention is applied this hydrocyanic acid can be removed in a suitable column because of its lower boiling point and then it does not affect the performance of the method according to the invention. Alternatively, the hydrocyanic acid may be left in the nitrile mixture and the method according to the invention may be performed in the presence of hydrocyanic acid. This will apply particularly when the method according to the invention makes use of the dilute aqueous nitrile solution obtained directly in washing the nitriles out of the reaction gases of the synthesis furnace. In such a case the hydrocyanic acid occurs in the first distillation stage together with the azeotropic mixture of acrylonitrile and water at the head of the extraction distillation column, and can then be eliminated from the acrylonitrile-water mixture in the usual way by distillation. The hydrocyanic acid content of the starting mixture has no influence on the purity of the acetonitrile obtained in the third stage.

The method according to the invention is illustrated in the following examples.

*Example 1* (see FIG. 1).—The mixture for purification has the following composition:

| | Percent by weight |
|---|---|
| Acrylonitrile | 80 |
| Water | 6.5 |
| Hydrocyanic acid | 6.5 |
| Acetonitrile | 7 |

1.95 kg. (about 2.4 litres) of this mixture are introduced, together with about 0.32 kg. of the nitrile mixture recovered at the head of the column 9, per hour into the 15th tray (from the top) of a bubble tray column (2) consisting of 20 practical trays. 45 litres of water are fed to the head of this column, the said water being preheated to about 50° C. The column is so heated that about 10 kg. of vapours distil over per hour and temperatures of just below 71° C. form above the 15th tray (from the top). The vapours passing over are condensed, phase separation occurring. The aqueous layer accumulating in the decanter 12 of this column (about 1 kg.) is returned to the column. 1.74 kg., i.e. about 2.2 litres, of distillate of the following composition are taken per hour from the organic layer:

| | Percent by weight |
|---|---|
| Acrylonitrile | 88 |
| Water | 5.0 |
| Hydrocyanic acid | 7.0 | while the remainder of the organic layer is returned to the column 2. Gas-chromatography examination of the distillate shows an acetonitrile content which can no longer be used and which in every case is below 0.1%.

The organic constituents are distilled out and separated from the dilute aqueous solution flowing away from the bottom of the column through 5, in the distillation column 6, a packed column of about 2 metres packed height. In this column, which is a stripper column, the aqueous solution supplied through pipe 5 is separated by azeotropic distillation into water and a mixture containing more acetonitrile than acrylonitrile. The vapors are condensed in condenser 19 and separated into two layers in decanter 20. The water layer is returned to column 6 through line 21. The organic layer amounts to about 0.6 litre per hour of a mixture containing more acetonitrile than acrylonitrile. This mixture still contains the saturation water and small quantities of hydrocyanic acid. It is introduced into the 7th tray (from the top) of a column consisting of 50 practical trays, a reflux ratio of about 7 being maintained in said column. The aqueous layer is taken from the decanter 24 through the pipe 13 into the pipe 5 so as to maintain a temperature of 76° C. in the 41st tray (from the top) without the bottom temperature dropping below 83° C. Practically all the water introduced into the distillation apparatus (9) at 8 is thus returned to the distillation column (6).

About 0.4 litre of head product is taken per hour from the organic layer of the decanter (24), and its composition corresponds approximately to that of the starting mixture and is introduced together with the starting product into the column (2). About 0.14 kg. of acetonitrile accumulate at the bottom of the column (9) at a temperature of above 83° C. and contains less than 1% acrylonitrile and only slight amounts of water.

*Example 2.*—The mixture for purification has the following composition:

| | Percent |
|---|---|
| Acrylonitrile | 85 |
| Acetonitrile | 10 |
| Water | 5 |

1 kg. of this mixture is introduced per hour together with about 0.18 kg. of the top product from the column 9, as in Example 1, into the 15th tray (from the top) of the bubble tray column 2 containing 20 practical trays. 25 litres of water are introduced at the top of the column, said water having been preheated to about 60° C. The column heating is so adjusted as to have a temperature of 70–71° C. above the 15th tray (from the top). About 4 kg. of distillate are condensed hourly and separated into two layers in the decanter 12. The aqueous layer (about 0.4 kg.) flows back into the column. 0.870 kg. of distillate of the following composition is taken per hour from the organic layer:

| | Percent |
|---|---|
| Acrylonitrile | 97 |
| Water | 3 |

The remainder of the distillate flows back into the column as reflux. The acetonitrile content of the distillate is less than 0.1%.

About 0.3 kg. nitrile mixture is distilled off from the solution at the bottom of the column 2 in the separating column (6) per hour and is then fractionated in the bubble tray column (9) with a reflux ratio of about 6 (as in Example 1). The temperature at the top of the column is about 72° C. About 0.1 kg. of acetonitrile containing less than 1% acrylonitrile accumulates per hour at a temperature of 83° to 85° C. at the bottom of the column. About 0.180 kg. of acrylonitrile-rich mixture is taken from the top of the column and is mixed with the feed mixture and thus cycled.

*Example 3* (see FIG. 2).—A mixture of the following composition:

| | G. |
|---|---|
| Water | 100,000 |
| Acrylonitrile | 1,800 |
| Acetonitrile | 86 |
| Hydrocyanic acid | 115 | is introduced hourly, together with about 250 g. of the nitrile mixture recovered at the head of the column (9), into the 16th tray (from the top) (about one-quarter of the height counting from the nitrile solution outlet) of the column (2) containing 25 practical trays. 32 litres of water at a temperature of 65° C. are introduced per hour to the head of this column. The column is so heated that about 10 kg. of vapours distil over per hour and temperatures of just below 71° C. form above the 15th tray (from the top). The vapours passing over are condensed, phase separation occurring. The aqueous layer accumulating in the decanter 12 of this column is returned to the head of the column. About 2000 g. of distillate of the following composition are taken per hour from the organic layer:

| | Percent |
|---|---|
| Acrylonitrile | 90 |
| Water | 4 |
| Hydrocyanic acid | 6 |
| Acetonitrile less than | 0.1 | while the remainder is also returned to the head of the column (2). A quantity of about 32 litres of dilute aqueous solution is continuously drawn off through the pipe 5 from the 21st tray (from the top) of the column while the excess of water flows out of the bottom 14 of the column.

The nitriles are distilled out of the aqueous solution in the separator (6) of a packed column of a packed height of 2 metres, and are separated in the decanter (12). The aqueous layer returns to the column (6) as reflux. Practically pure water is discharged at the bottom (7). About 360 g. of nitrile mixture still containing saturation water were obtained. This mixture was fed through the pipe 8 into the 7th tray (from the top) of a column (9) which consists of 50 practical trays and in which a reflux ratio of about 8 is maintained. The aqueous layer is taken from the decanter 12 and fed through the pipe (13) back to the separator 6 so as to maintain a temperature of 76° C. in the 41st tray (from the top) without the bottom temperature dropping below 83° C. About 250 kg. of head product is taken per hour from the organic layer of the decanter (12) and in addition to an excess of acrylonitrile also contains acetonitrile and water according to the saturation. It is introduced through the pipe (10) as already stated, together with the feed mixture, to the column (2). About 80 g. of acetonitrile accumulate per hour at a temperature of above 83° C. at the bottom of the column 9 and this acetonitrile contains less than 1% acrylonitrile and only slight quantities of water.

We claim:

1. A process for the continuous recovery of acrylonitrile and acetonitrile from the reaction products of an acrylonitrile synthesis by reaction of propylene with ammonia and oxygen which comprises subjecting a liquid mixture of water and the said reaction products wherein the acetonitrile content is 2 to 20% by weight based on the acrylonitrile to a three-stage fractional distillation, the liquid mixture being introduced, in the first stage, into the bottom portion of a distillation column at the top of which is introduced 150 to 400 times the quantity by weight of water based on the acetonitrile, the top three-quarters of the column being maintained at a temperature just below 71° C. so that an acetonitrile-free azeotrope of acrylontrile and water is obtained at the top of the column while at the lower end of the column there is obtained a mixture of acetonitrile, water and acrylonitrile, the acrylonitrile being in an amount by weight not exceeding the acetonitrile, in the second stage, subjecting said mixture of acetonitrile, water and acrylonitrile to azeotropic distillation in a stripper column to distill off the nitriles from the major portion of the water contained in such mixture, condensing the acrylonitrile-acetonitrile-water vapors leaving the head of such stripper column, separating the organic layer from the condensation product in a decanter to obtain a lower water content acrylonitrile-acetonitrile mixture, said latter mixture being fed in the third stage to the top of a distillation column, wherein the top is maintained at a temperature between about 72° C. and just below 73° C. and the upper four-fifths of this column passes through a temperature gradient from such temperature at the top to 76° C., and in the bottom of which column substantially anhydrous pure acetonitrile is obtained while at the top of said column vapors containing acrylonitrile and acetonitrile are obtained, condensing such vapors, separating the organic layer from the latter condensation product in a decanter and recycling the acrylonitrile-acetonitrile-water content of such organic layer to the first stage of the process.

2. A process for the continuous recovery of acrylonitrile and acetonitrile from the reaction products of an acrylonitrile synthesis by reaction of propylene with ammonia and oxygen which comprises subjecting a liquid mixture of water and the said reaction products wherein the acetonitrile content is 2 to 20% by weight based on the acrylonitrile to a three-stage fractional distillation, the liquid mixture being introduced, in the first stage, at about ¼ of the height of a distillation column at the top of which is introduced 150 to 400 times the quantity by weight of water based on the acetonitrile, the top three-quarters of the column being maintained at a temperature just below 71° C. so that an acetonitrile-free azeotrope of acrylonitrile and water is obtained at the top of the column while at the lower end of the column there is obtained a mixture of acetonitrile, water and acrylonitrile, the acrylonitrile being in an amount by weight not exceeding the acetonitrile, in the second stage, subjecting said mixture of acetonitrile, water and acrylonitrile to azeotropic distillation in a stripper column to distill off the nitriles from the major portion of the water contained in such mixture, condensing the acrylonitrile-acetonitrile-water vapors leaving the head of such stripper column, separating the organic layer from the condensation product in a decanter to obtain a lower water content acrylonitrile-acetonitrile mixture, said latter mixture being fed in the third stage to the top of a distillation column, wherein the top is maintained at a temperature between about 72° C. and just below 73° C. and the upper four-fifths of this column passes through a temperature gradient from such temperature at the top to 76° C., and in the bottom of which column substantially anhydrous pure acetonitrile is obtained while at the top of said column vapors containing acrylonitrile and acetonitrile are obtained, condensing such vapors, separating the organic layer from the latter condensation product in a decanter and recycling the acrylonitrile-acetonitrile-water content of such organic layer to the first stage of the process.

3. A process according to claim 2 in which the starting mixture is a liquid mixture of acrylonitrile and acetonitrile having a water content of less than 10% and the acetonitrile-acrylonitrile-water mixture is taken off from the bottom of the distillation column in the first distillation stage.

4. A process according to claim 2, in which the starting mixture is an aqueous solution of acrylonitrile and acetonitrile and the acetonitrile-acrylonitrile-water mixture is drawn off one of the bottom trays in the first distillation stage and the excess water is obtained at the bottom of the column.

References Cited by the Examiner
UNITED STATES PATENTS

| | | | |
|---|---|---|---|
| 2,305,106 | 12/1942 | Pratt | 203—14 |
| 2,681,306 | 6/1954 | Kemp et al. | 203—96 |
| 2,773,088 | 12/1956 | Maslan | 203—82 X |
| 2,807,573 | 9/1957 | Robertson | 203—8 X |
| 3,003,929 | 10/1961 | Bright | 203—97 X |
| 3,012,947 | 12/1961 | Kelley et al. | 203—60 X |
| 3,073,753 | 1/1963 | Hadley et al. | 203—8 X |

NORMAN YUDKOFF, *Primary Examiner.*

W. L. BASCOMB, *Assistant Examiner.*